Figure 1:
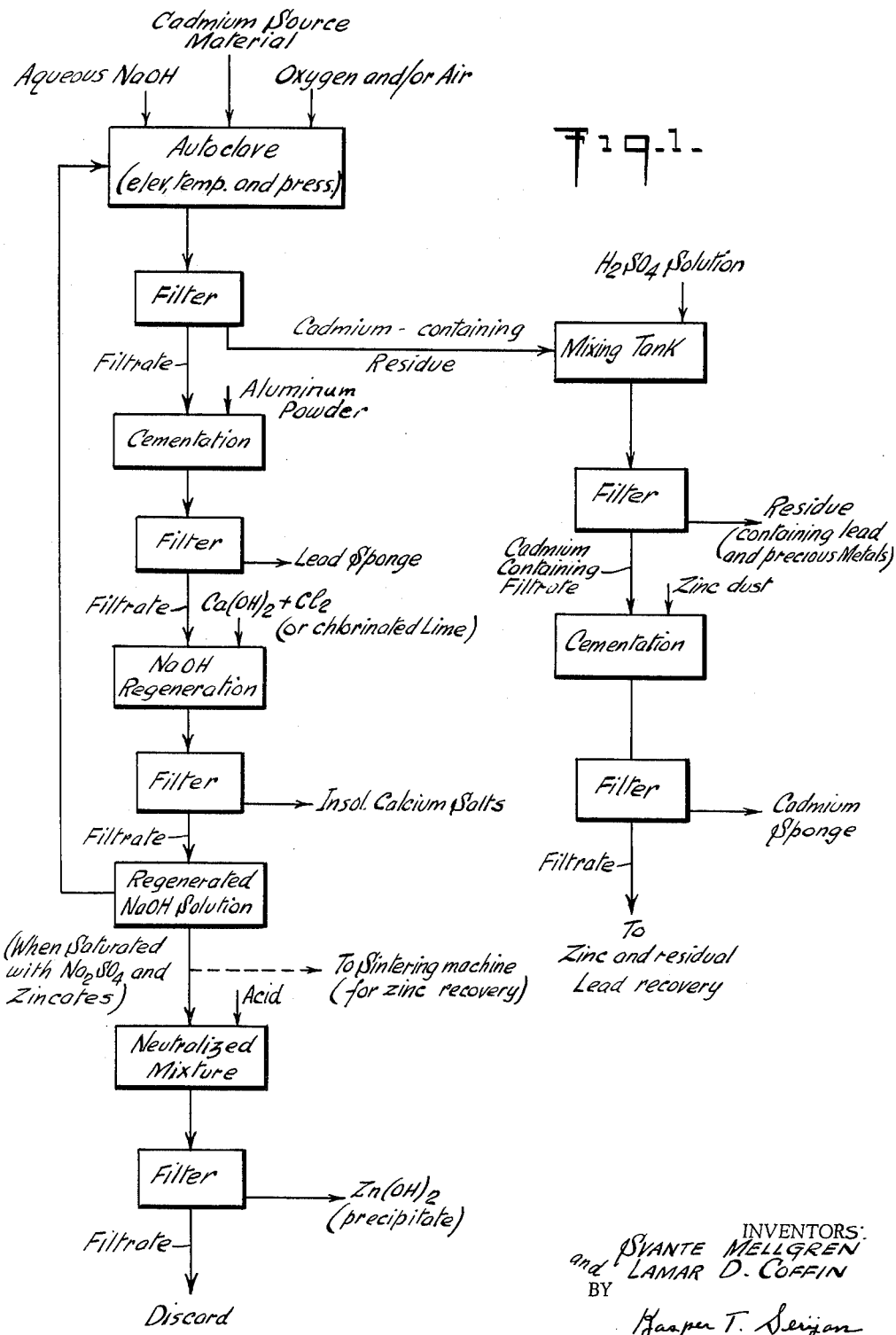

INVENTORS:
SVANTE MELLGREN
and LAMAR D. COFFIN
BY
Hasper T. Serijan
ATTORNEY

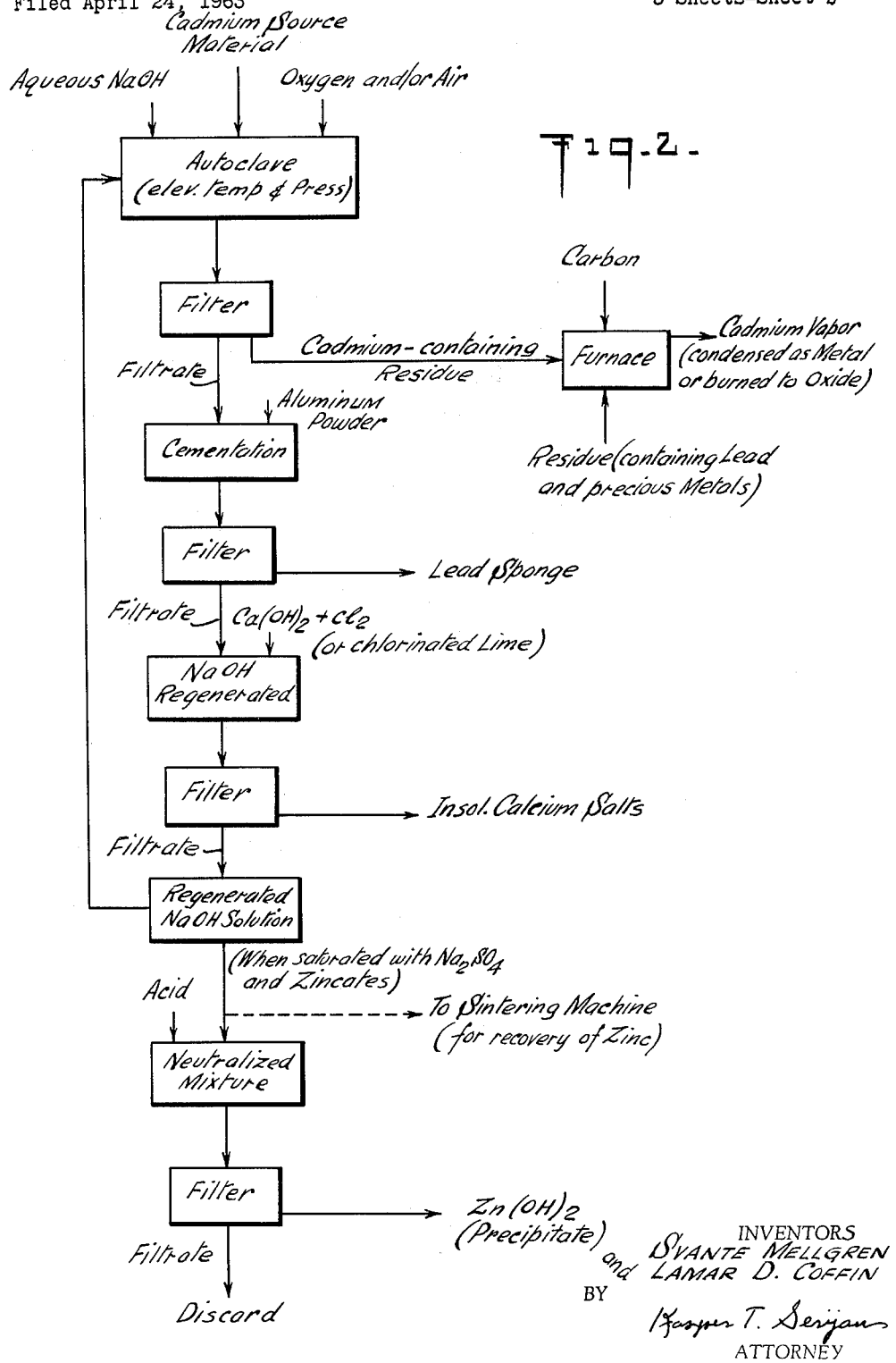

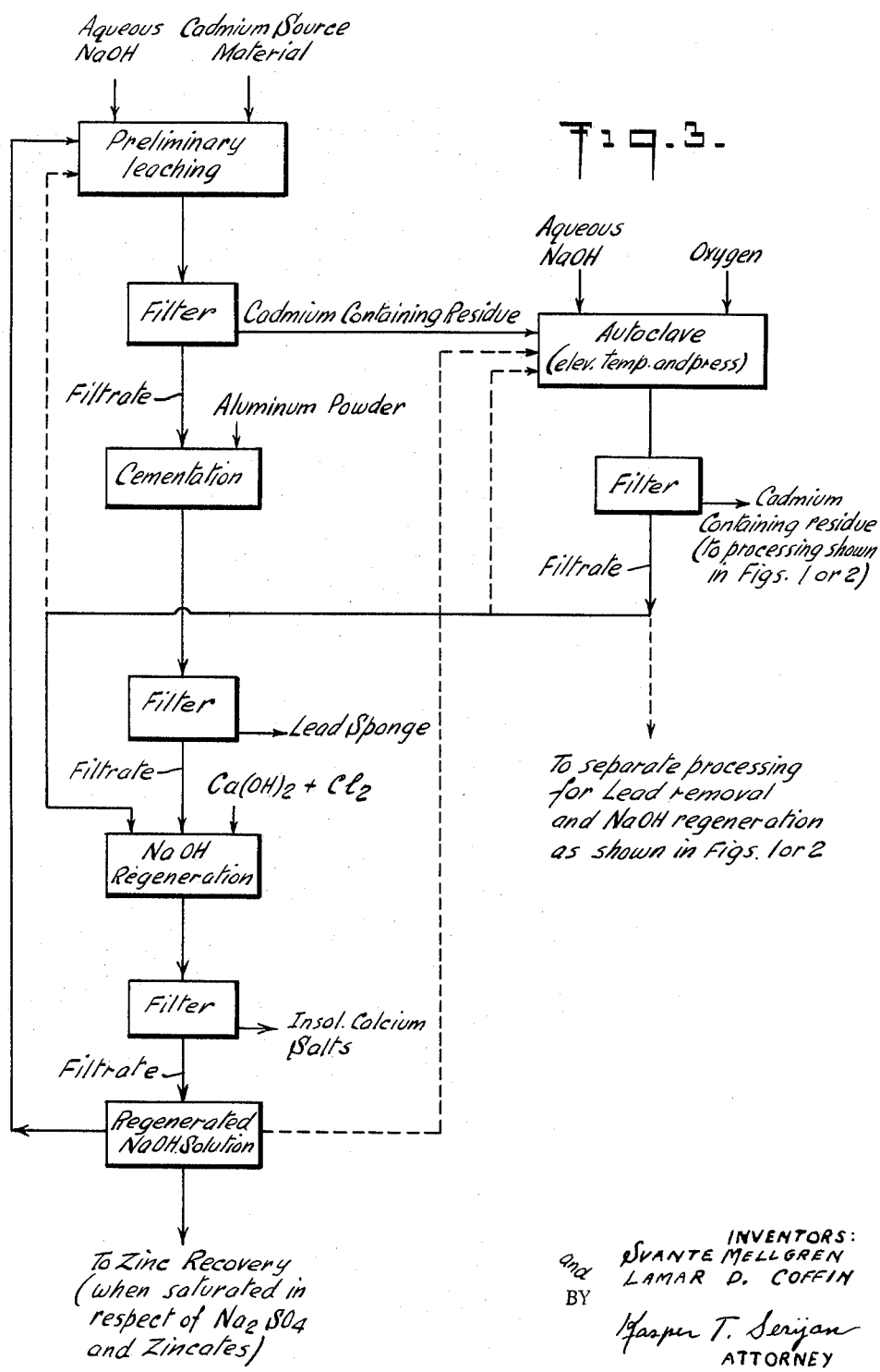

3,248,212
PROCESS FOR USING AQUEOUS SODIUM HYDROXIDE FOR RECOVERING CADMIUM AND OTHER METAL VALUES FROM METALLURGICAL DUSTS AND FUMES
Svante Mellgren, Metuchen, and Lamar D. Coffin, Edison, N.J., assignors to American Metal Climax, Inc., New York, N.Y., a corporation of New York
Filed Apr. 24, 1963, Ser. No. 275,330
15 Claims. (Cl. 75—101)

This invention relates to the treatment of cadmium-bearing materials and relates particularly to a new and novel process for the treatment of metallurgical dusts and fumes which contain cadmium in sulfidic or oxidic form. The invention is useful as providing an efficient and economical process for separating the cadmium content particularly from the other substances contained in the metallurgical dusts and fumes which ordinarily include lead, arsenic and zinc values in significant quantities as well as other metal values inclusive of relatively smaller amounts of antimony, tin, gold, silver, etc. which may also be present in such dusts and fumes.

While a number of processes have been proposed for treating cadmium-containing dusts and fumes for the recovery of cadmium, the prior art processes have not proven too satisfactory because of their complexity, high cost and poor recoveries. A representative prior art process for the treatment of flue dust as obtained, for example, from a zinc ore sintering plant consists of mixing the cadmium sulfide-containing dust with sulfuric acid, roasting the mixture to eliminate arsenic and sulfur, leaching the roaster discharge to separate the resulting cadmium oxide which is soluble in dilute acid from the other metal values which remain in the residue and treating the cadmium-containing solution as by the addition of zinc dust to cement out the cadmium as sponge. Although practiced commercially for some years, the cadmium extraction process described above as being illustrative of one of the more widely used prior art procedures has been found difficult and cumbersome to carry out in large scale operation. For example, the steps of mixing the dust with concentrated acid and roasting the resulting acid mixture with their attendant corrosion problems have proven troublesome. Then too, serious pollution and toxicity problems are presented by the discharge of arsenic or arsine, as the case may be, to the atmosphere in the course of roasting the charge and the subsequent cementation step. As for the recovery of cadmium, the yield in this particular process as well as other prior art processes rarely exceeds 85% which clearly indicates the need for improvements whereby more efficient and economical recovery of the cadmium may be attained.

The present invention avoids the need for the cumbersome mixing the dusts and fumes with acid as well as the subsequent roasting step with its objectionable discharge of arsenic into the atmosphere. Another highly significant advantage of the present invention is the practically quantitative recovery of cadmium which is readily obtained along with the recovery of other desired metal values that may be present in the material.

It is accordingly the principal object of this invention to provide an improved process for the treatment of cadmium-containing dusts and fumes whereby excellent recoveries of practically the entire cadmium content of the material are readily obtainable in addition to the recovery of other important metal values usually contained in such dusts and fumes.

It is another object of this invention to provide an efficient and economical process for the recovery of cadmium and other metal values from cadmium-containing dusts and fumes wherein the arsenic usually associated with such materials may be effectively separated without incurring air pollution and other toxicity hazards during treatment of the material.

Other objects and advantages of this invention will become apparent as the specification proceeds.

The present invention contemplates the treatment of any cadmium-containing material in particulate form wherein the cadmium may be present either as sulfide or oxide as well as mixtures thereof which may also include cadmium as sulfate, sulfite, etc. whereby a relatively pure cadmium product as metal or oxide is obtained in essentially quantitative yield. This invention is particularly useful as it relates to the treatment of cadmium-bearing dusts and fumes obtained from a zinc ore sintering plant wherein the cadmium is present in the resulting dusts and fumes predominantly as sulfide. Such materials hereinafter sometimes referred to as "the cadmium source material" generally contain from 9 to 30% cadmium, 7 to 11% sulfur, 19 to 38% lead, 1 to 5% arsenic, 7 to 25% zinc and usually smaller amounts of other elements as 0.1 to 0.2% tin, 0.03 to 0.2% antimony as well as precious metals such as gold, silver, etc. A mixture of dusts and fumes from various sources representative of the material suitable for use in the present process typically contains about 16.8% cadmium, 8.3% sulfur, 29.8% lead, 2.5 to 3.5% arsenic and 13.8% zinc with other metals including precious metal values usually being present in relatively small amounts.

In accordance with the present invention, the cadmium source material is subjected to treatment comprising (1) admixing said material with aqueous alkali metal hydroxide solution, (2) heating the mixture at superatmospheric pressure in the presence of an oxidizing atmosphere for a period of time sufficient to convert the metallic sulfide to oxide and the arsenic substantially completely to soluble form by this autoclaving treatment, (3) separating the solid and liquid phases with the former containing all of the cadmium and the latter practically all of the arsenic and sulfur, if present, and (4) recovering the metal values from said phases. For recovering the cadmium and other metal values from the aforesaid solid phase, either hydrometallurgical or pyrometallurgical procedures or both may be used as will be hereinafter described.

A modification of the above process consists of initially leaching the cadmium source material with aqueous hot alkali metal hydroxide solution and separating the insoluble residue which retains substantially all of the cadmium content from the leach liquor. This preliminary leaching step enables a very substantial reduction in the mass of the cadmium source material requiring subsequent treatment in the autoclave without adversely affecting the substantially quantitative recovery of cadmium in the process.

The step in the invention of heating the cadmium-containing dusts and fumes with aqueous alkali metal hydroxide solution under pressure and in the presence of an oxidizing atmosphere may be carried out in conventional type pressure reaction vessels, e.g., an autoclave which is provided with an agitator, heating means, and means for passing a gas into the reaction vessel and for venting the vessel upon completion of the reaction.

The autoclaving step consists of heating a mixture of the cadmium source material in particulate form with aqueous alkali metal hydroxide, e.g. sodium hydroxide to between 175 and 300° C. or somewhat higher for from about 1.5 to 6 hours at superatmospheric pressures of from 200 to 500 p.s.i.g. in an oxidizing atmosphere provided by air, oxygen or oxygen-enriched air. Preferred operating conditions consist of the use of temperatures of about 200 to 225° C., a reaction time of about 2 to 3 hours and pressures ranging from 250 to 400 p.s.i.g. The oxidizing gas may be introduced into the reaction vessel either initially, intermittently or continuously, it being preferred, however, to introduce said gas continuously throughout the reaction period.

Any alkali metal hydroxide, e.g. of sodium, potassium, lithium, cesium and rubidium or various mixtures thereof may be used in making up the charge for the aforesaid treatment of the cadmium source material in the autoclave. Since sodium hydroxide is the preferable alkali metal hydroxide to employ because of its availability and cheaper cost, the invention will be described in reference to NaOH hereinafter. The same applies to the preliminary leaching step which will be hereinafter discussed in more detail.

The ratio of NaOH to the cadmium source material in making up the charge for treatment in the autoclave may vary as from between 1 and 5 of NaOH to 1 of the cadmium source material by weight, the preferred ratio, however, being about 1.5 and 2 of NaOH to 1 of the cadmium source material. The optimum ratio will vary somewhat depending on various factors such as (a) the nature of the particular cadmium source material, (b) the reaction conditions involving the selection of the temperature, pressure and oxidizing gas to be used in the autoclaving step, and (c) whether or not the cadmium source material has been subjected to the optional pretreatment consisting of the aforementioned leaching with hot alkali metal hydroxide solution. Likewise, the quantity of water used in conjunction with the alkali metal hydroxide in making up the caustic solutions thereof may be varied as between 1 to 5 or more by weight of water to 1 of NaOH or any other of the alkali metal hydroxides. It usually suffices, however, to use NaOH solutions containing water to NaOH in the ratio of about 2 to 1 respectively. Those skilled in the art should experience no difficulty in ascertaining the quantity of NaOH and water which is conducive to best results taking into consideration the other variables mentioned above.

The reaction mixture resulting from treatment of the cadmium source material in the autoclave as described above is then separated as by filtration or centrifugation while still hot or after cooling to provide a residue and filtrate. It is a significant feature of this invention that the separated and washed residue while containing, for all practical purposes, nearly 100% of the cadmium content of the cadmium source material should contain less than 0.05% by weight of arsenic and usually not more than about 0.02% arsenic if the autoclaving step has been exploited to its full capability. Analysis of the residue to determine its sulfur and arsenic content will clearly indicate whether or not the desired results have been achieved particularly in respect of the cadmium sulfide having been completely oxidized and the arsenic having been substantially completely converted to soluble form in the NaOH solution whereby the separated solid phase comprising the residue may be extremely low in its arsenic content or practically arsenic-free. Should the analysis indicate incomplete oxidation of sulfide or insufficient solubilization of the arsenic, resort may be had to adjusting the ratio of the reactants and/or the reaction conditions accordingly to effect the desired results.

As previously indicated, the cadmium source material may be preliminarily leached with hot alkali metal hydroxide solution, e.g. aqueous NaOH solution, before treatment thereof in the autoclave. This prior leaching treatment results in reducing by as much as 65%, the bulk of the cadmium source material to be subsequently treated in the autoclave thereby enabling more efficient utilization of the autoclaving facilities. Such preliminary leaching results in extraction of a considerable quantity of the arsenic, zinc and lead content among other substances contained in the cadmium source material with up to as much as 85% of the lead and arsenic content being extracted thereby. The residue from the preliminary leaching treatment which is subsequently treated in the autoclave for oxidation of the sulfur and removal of the remaining arsenic contains, however, all of the cadmium initially present in the cadmium source material. It has been observed in this connection that the preliminary leaching treatment renders the sulfur in the residue somewhat more difficult to oxidize during the autoclaving step. This does not present a serious problem, however, since appropriate adjustment of the reaction conditions in the autoclaving step may be made as by increasing the temperature and pressure, using oxygen instead of air, etc. to achieve the desired oxidation in a completely satisfactory manner.

The prior leaching treatment of the cadmium source material comprises mixing said material in hot aqueous alkali metal hydroxide solution, e.g., NaOH and maintaining the temperature of the mixture, preferably with agitation, at or slightly below the boiling point for from 1 to 4 hours and preferably about 2 hours after which the material is filtered or centrifuged either while still hot or after cooling to separate the cadmium-containing residue from the liquid phase. As in the autoclaving step, the quantity of NaOH or other alkali metal hydroxide used in the preliminary leaching step may be varied considerably using ratios generally ranging from 1 to 5 but preferably being about 2 of NaOH to 1 by weight of the cadmium source material. The quantity of water for making up the NaOH solution for use in the prior leaching step may also be varied over a considerable range as from 1 to 4 or 5 of water to 1 of NaOH by weight, the ratio of about 2 of water to 1 of NaOH being usually conducive to satisfactory results. If desired, the filtrate from the autoclaving step may be used to furnish at least part of the NaOH solution used in the preliminary leaching treatment when the impurity level of said filtrate is relatively low as when the autoclaving step is carried out on material previously leached with hot caustic solution. The NaOH may otherwise be from any source as newly added caustic or as regenerated NaOH resulting from processing of the filtrate as will be hereinafter described.

The residue obtained from the autoclaving step, after washing to remove residual soluble material therefrom, will usually contain, in the case of sulfidic dusts and fumes from a zinc ore sintering plant, upwards of 40% cadmium and less than 0.05, 0.2 and 1% of arsenic, sulfur and zinc respectively. The lead content thereof will vary generally from about 1 to 40% or thereabouts depending primarily on whether air or oxygen was used as the oxidizing atmosphere during treatment of the material in the autoclave.

The use of oxygen as opposed to air as the oxidizing atmosphere during the autoclaving step affects the distribution of the lead content in that oxygen causes a major part of the lead present in the cadmium source material to become converted to insoluble lead oxide ($PbO_2$) which reports in the residue along with the cadmium. The use of air as the oxidizing atmosphere during the autoclaving step results in converting a large portion of the lead to soluble form in caustic solution leaving relatively little lead in the cadmium-containing residue.

The cadmium-containing residue from the autoclaving step may be further treated in various ways to separate the cadmium from the other metal values contained therein. The cadmium may be solubilized, for example, by boiling in sulfuric acid solution whereupon addition of zinc dust to the filtrate cements out cadmium as sponge. This hydrometallurgical approach has been found efficacious with the use of aqueous acid solutions containing at least 60 grams $H_2SO_4$ per liter with slightly higher concentrations as from 70 to 100 grams per liter being preferred. Boiling the mixture for about 2 hours in an excess of the acid suffices to completely solubilize the cadmium.

Alternatively, the cadmium containing residue from the autoclaving treatment may be subjected to pyrometallurgical processing for the recovery of cadmium as by heating the residue in admixture with a carbonaceous substance such as carbon in excess of stoichiometric requirement and fuming off the cadmium. The cadmium thus separated from the residue may be distilled, if desired, to cadmium metal or burned to cadmium oxide. The residual product usually being mostly lead but also containing whatever precious metal values may have been present in the cadmium source material may be further processed in accordance with conventional practice.

The filtrate from the autoclaving step may be treated either separately or after combining the same with the filtrate from the preliminary leaching operation for lead removal and NaOH regeneration. To the extent that the filtrate from the autoclaving step contains NaOH and the solution is not saturated with respect to soluble zincate salts and sodium sulfate, as occurs particularly when the cadmium source material treated in the autoclave has been subjected to the aforementioned preliminary leaching treatment, the filtrate may be used repeatedly either as is or after NaOH regeneration in making up or augmenting the caustic solution employed in the preliminary leaching or autoclaving operations as may be appropriate.

Lead removal may be accomplished by cementation as by the addition of aluminum powder to the alkaline solution comprising the filtrates, lead metal being formed in accordance with the conversion:

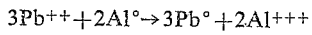

$$3Pb^{++} + 2Al^\circ \rightarrow 3Pb^\circ + 2Al^{+++}$$

Following separation of lead as metal, the filtrate is then treated for NaOH regeneration. This may be accomplished by the addition of calcium hydroxide and chlorine or, alternatively, chlorinated lime, the chlorine being required to oxidize the arsenic to its highest valence to effect reaction with $Ca(OH)_2$. The reaction involved in the regeneration of NaOH which proceed satisfactorily at room temperature or thereabouts are as follows:

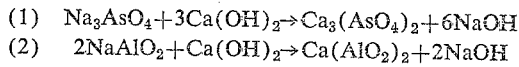

(1) $Na_3AsO_4 + 3Ca(OH)_2 \rightarrow Ca_3(AsO_4)_2 + 6NaOH$
(2) $2NaAlO_2 + Ca(OH)_2 \rightarrow Ca(AlO_2)_2 + 2NaOH$ The resulting calcium salts which are insoluble are easily separated leaving an alkaline solution containing the regenerated NaOH which may then be returned for reuse in the process in conjunction with the autoclaving as well as the preliminary leaching steps with whatever additional NaOH that may be required being supplemented from an outside source to bring the concentration of NaOH in the aqueous solution to the desired level. However, since a buildup of soluble zincates and $Na_2SO_4$ takes place in such filtrates upon repeated use thereof, the reuse of the alkaline solutions becomes limited accordingly as saturation is reached in respect of such soluble salts. After saturation is reached, acid may be added to the zincate-containing alkaline solution to adjust the pH to approximately 7 whereupon zinc hydroxide is precipitated. After removal of the $Zn(OH)_2$, the spent solution may be discarded. Alternatively, the zincate-saturated solution may be charged to the sintering machine for recovery of its zinc values.

To facilitate an understanding of the invention, reference is made to the accompanying drawings illustrating various embodiments of the process in which:

FIGURE 1 represents a flow sheet indicating the procedure for recovering cadmium values from fumes and dusts in accordance with one embodiment of the invention;

FIGURE 2 represents a flow sheet for the recovery of cadmium values as shown in the preceding figure but modified to include pyrometallurgical treatment of the autoclave residue in lieu of hydrometallurgical processing as shown in FIGURE 1; and FIGURE 3 represents a flow sheet of the process as modified by inclusion of a preliminary leaching step prior to processing the material as shown in the preceding figures.

In carrying out the process according to the flow sheet shown in FIGURE 1, the charge to a 3-liter capacity autoclave consisting, for example, of 200 gms. of cadmium source material containing 16.8% Cd, 8.3% S, 28.9% Pb, 3.45% As, 13.8% Zn and 2.8% C mixed with 500 gms. of NaOH dissolved in 1 liter of water was heated to 190° C. for 2 hours in an oxygen atmosphere providing, at the elevated temperature, a pressure of 400 p.s.i.g. The reaction mixture was then filtered resulting in a residue amounting to 71.6% of the original weight of the cadmium source material and a liquid phase. Analysis revealed the residue as containing 43.1% by weight of Cd, 0.12% S, 0.05% As, 0.5% Zn and 29.7% Pb. The cadmium content of the filtrate was nil, said filtrate containing in addition to the balance of the arsenic, on a per liter basis, 17 gms. of S, 14 gms. Zn and 6 gms. Pb. It will be seen from the above that virtually 100% of the cadmium content of the cadmium source material reported to the insoluble phase comprising the residue.

Substantially the same results as the above were obtained using a lower pressure of 250 p.s.i.g. but a longer reaction time of 4 hours in the autoclave. When air was substituted for oxygen as the oxidizing atmosphere, however, with the other conditions and reactants being as above described, appreciably more of the lead was solubilized during autoclaving resulting in a residue amounting to only 46% of the weight of the cadmium source material. Analysis showed this residue as containing 67% Cd, 0.17% S, 0.05% As, 0.8% Zn and only 9.7% Pb. The lead content of the filtrate was increased accordingly to 50 gms. per liter but the cadmium content thereof was again nil.

The hydrometallurgical treatment of the residue indicated in FIGURE 1 was carried out using sulfuric acid solution (containing 100 gms. $H_2SO_4$ per liter) in the ratio of 800 ml. of acid solution per 100 gms. of residue, the mixture being boiled for an hour and then filtered. This treatment resulted in solubilizing better than 98% of the cadmium as evidenced by a cadmium content in the resulting residue of less than 0.5%. The cementation of cadmium as sponge by means of zinc dust addition in accordance with known practice enabled substantially complete recovery of the cadmium values from the acid leaching filtrate. The filtrate freed of its cadmium content may then be processed in any desired manner for the recovery of the zinc and residual metal values. The residue from the acid leaching step to which precious metals report, if present in the original cadmium source material, may be likewise processed according to known procedures for recovery of silver, gold and such other metal values contained therein.

The processing of the caustic filtrate from the autoclaving step aimed at recovery of lead and ultimately the zinc values and the regeneration of NaOH for further use of the caustic solution in the process as shown in FIGURE 1 consisted of cementing elemental lead from the solution by means of aluminum powder addition, then adding calcium hydroxide and chlorine or, alternatively, chlorinated lime to the lead-free solution whereby insoluble calcium salts were formed with regeneration of NaOH in accordance with the reactions previously mentioned. The regenerated solution freed of its insoluble calcium salts may then be reused in the process as indicated with new NaOH being added thereto in amounts sufficient to bring the NaOH concentration of the recycled solution to desired strength. As previously stated, however, the occurrence of a cumulative buildup of certain soluble impurities consisting of zincates and $Na_2SO_4$ precludes the continued use of the regenerated solution once saturation in respect of these impurities is reached.

In carrying out the above-mentioned cementation of lead from the caustic filtrate from the autoclaving step by means of aluminum addition, it was found that close to 98% of the lead contained in such filtrate was readily recoverable. By way of illustration, a representative caustic filtrate (2200 ml.) containing 22.8 gms./liter of Pb was agitated after addition thereto of aluminum powder (preferably of fine pigment grade) for an hour. The cementation product separated from the mixture by filtration amounted to 48.7 grams with the lead content of the cementation solution (2030 ml.) having been reduced to 0.67 gms./liter. The aluminum consumption in that process was in the ratio of 1 part by weight aluminum per 7 parts lead.

The cementation solution freed of its lead content as described above was then treated with a 50% excess of $Ca(OH)_2$ (based on the Al, Zn and As) at room temperature with chlorine gas being passed through the mixture. In the case of a representative solution containing 359 gms./liter of NaOH, the resulting regeneration of NaOH was found to increase the NaOH concentration to 421 gms./liter indicating 53% NaOH regeneration. This regenerated NaOH solution, after removal of the insoluble calcium salts therefrom may be recycled repeatedly until the aforementioned buildup of zincates etc. precludes further reuse of the solution. Thereupon, the solution may be processed for zinc removal and thereafter discarded.

The process outlined in FIGURE 2 differs essentially from that discussed with reference to the preceding figure in respect of the subsequent treatment of the residue from the autoclaving step for the recovery of cadmium therefrom. In this embodiment, the cadmium-containing residue is subjected to pyrometallurgical treatment consisting of heating the material in a reducing atmosphere as provided by mixing a carbonaceous substance therewith to a temperature sufficient to volatilize the cadmium. The cadmium thus fumed off may be distilled to provide cadmium metal or may be burned for collection as cadmium oxide as desired. The non-volatile metals inclusive of lead and precious metals retained in the furnacing charge may be processed in accordance with known procedures for recovery of such metal values.

With the incorporation of the prior leaching step in the process as represented in FIGURE 3, the subsequent treatment of the residual cadmium source material in the autoclave should be in an oxygen atmosphere in order to achieve satisfactory sulfur and arsenic removal therefrom. By way of illustration, a charge consisting of 6400 gms. of mixed dusts containing 16.8% Cd, 8.3% S, 29.8% Pb, 3.45% As, 13.8% Zn and 2.8% C was leached for two hours with hot NaOH solution consisting of 8 kilograms NaOH dissolved in 32 liters of water. The leached residue amounting to 2240 gms. or 35% of the initial weight of the cadmium source material was found upon analysis to contain 50.3% Cd, 9.5% S, 14.3% Pb, 0.9% As and 4.4% Zn. The filtrate or leach solution on a grams per liter basis contained 0.07 Cd, 68.4 Pb, 37.7 Zn, 0.9 As and 4.4 Zn indicating transfer of a major portion of the lead, zinc and arsenic contained in the cadmium source material to the preliminary leaching solution had taken place. The treatment of the filtrate from this preliminary leaching step involving lead removal and regeneration of NaOH enabling reuse of the regenerated solution consists of substantially the same processing steps previously discussed with reference to the filtrate from the autoclaving step omitting the preliminary leaching treatment.

In another run, a charge consisting of mixed dusts comprising a cadmium source material like the one described above was subjected to a similar preliminary leaching treatment whereupon a residue was obtained analyzing 54.8% Cd, 9.9% S, 9% Pb, 0.7% As and 3.3% Zn with silver and gold also being contained in relatively small amounts. A charge consisting of 1725 gms. of said residue in admixture with 1725 gms. NaOH dissolved in 8.6 liters of water was heated to between 190 and 210° C. for 6 hours with oxygen being continuously passed into the autoclave providing a pressure of 400 p.s.i.g. The reaction mixture was thereafter filtered resulting in a residue weighing 1485 gms. analyzing 61% Cd, 0.2% S, 12% Pb, 0.03% As and 0.4% Zn and 9.6 liters of filtrate containing on a grams per liter basis only a trace amount of Cd, 14.7 S, 1 Pb, 1.1 As, 5.7 Zn, 0.3 $SiO_2$ and 90 NaOH. Tests run on 100 gm. batches of the above residue dispersed in sulfuric acid solution (1350 ml. $H_2O$ containing 100 gms. per liter $H_2SO_4$) indicated practically complete solubilization of the cadmium content with 2 hours boiling of the mixture with the resulting acid solution after removal of residual solids analyzing at 43.1 gms./liter with the arsenic content thereof being only 0.02 gms./liter. Subsequent treatment of the cadmium-containing sulfuric acid solution by cementation with zinc as shown in FIGURE 1 provided an overall cadmium recovery of better than 99% based on the cadmium value contained in the original cadmium source material. The residual solids from the acid boiling treatment indicated a silver and gold content of 6681 and 14.6 oz./ton respectively.

As indicated (by broken lines) in FIGURE 3, the filtrate from the autoclaving step may be returned at least in part for reuse in either or both the autoclaving and preliminary leaching operations with appropriate additions of NaOH being made as may be required to replace the NaOH consumed in the autoclaving step. When the concentration of contaminants becomes such that reuse of the filtrate from the autoclaving step is no longer practical it may then be either separately processed as indicated (by broken lines) in the flow sheet or combined with the filtrate from the preliminary leaching step for lead removal, NaOH regeneration, etc. whereupon the regenerated NaOH solution may be likewise used repeatedly (with appropriate NaOH addition) in conjunction with the autoclaving and preliminary leaching steps until saturation of said solution with soluble zincates and $Na_2SO_4$ precludes its further use.

It will be apparent from the foregoing that various modifications other than those mentioned above may be made in the details of the process. It is believed, however, that the autoclaving step as hereinabove described is a novel process as applied to the processing of cadmium source materials of the described nature for cadmium recovery. Accordingly this step is being claimed broadly as well as specifically in combination with the treatment steps leading to the ultimate separation of the cadmium values.

What is claimed is:

1. In a process for the recovery of cadmium values from a cadmium source material consisting of metallurgical dusts and fumes containing cadmium and above 0.05% by weight of arsenic, the steps comprising:
   (a) heating the cadmium source material in admixture with aqueous alkali metal hydroxide solution under pressure in an oxidizing atmosphere for a period of time sufficient to solubilize a major portion of the arsenic,
   (b) separating the residual solids containing substantially all of the cadmium contained in said cadmium source material and less than 0.05% by weight of arsenic from the liquid phase containing the solubilized arsenic, and
   (c) treating the separated residual solids to recover the cadmium values therefrom.

2. The process of claim 1 wherein treating the separated residual solids to recover the cadmium therefrom comprises:
   (a) digesting said solids in aqueous sulfuric acid of a concentration of at least 60 grams of sulfuric acid per liter of acid solution to solubilize the cadmium,
   (b) separating undissolved solids from the acidic cadmium-containing filtrate,
   (c) adding zinc dust to said filtrate to cement out the cadmium therefrom, and
   (d) separating the precipitated cadmium from said filtrate.

3. The process of claim 1 wherein treating the separated residual solids to recover the cadmium therefrom comprises:
  (a) mixing a carbonaceous substance therewith,
  (b) heating said solids in admixture with said carbonaceous substance to effect volatilization of cadmium vapors in a reducing atmosphere, and
  (c) collecting said cadmium vapors and condensing the same.

4. In a process for recovering cadmium values from a cadmium source material consisting of metallurgical dusts and fumes containing cadmium at least partly as sulfide and above 0.05% by weight of arsenic, the steps comprising:
  (a) heating said cadmium source material in admixture with an aqueous alkali metal hydroxide solution in an autoclave to a temperature of from 175 to 300° C. for from 1.5 to 6 hours in an oxidizing atmosphere providing a pressure from 200 to 500 p.s.i.g. to effect solubilization of a major portion of the arsenic and oxidation of the cadmium sulfide,
  (b) separating the residual solids containing substantially all of the cadmium contained in said cadmium source material and less than 0.05% by weight of arsenic from the liquid phase containing the solubilized arsenic, and
  (c) treating the separated residual solids for the recovery of cadmium therefrom.

5. In a process for the recovery of cadmium and other metal values from a cadmium source material consisting of metallurgical dusts and fumes containing sulfidic cadmium, above 0.05% by weight of arsenic, and values of at least one other metal selected from the group consisting of lead, zinc, silver and gold, the steps comprising:
  (a) heating said cadmium source material in admixture with aqueous alkali metal hydroxide solution in an autoclave under superatmospheric pressure and in an oxidizing atmosphere for a period of time sufficient to solubilize a major portion of the arsenic and to oxidize the cadmium sulfide to cadmium oxide,
  (b) separating the residual solids containing substantially all of the cadmium, silver and gold values and at least part of the lead and zinc values present in said cadmium source material and less than 0.05% by weight of arsenic from the liquid phase containing solubilized arsenic, lead and zinc, and
  (c) treating said residual solids to separate the cadmium from the other metal values contained therein.

6. The process of claim 5 including the further steps of treating the separated liquid phase for removal of lead and arsenic and regeneration of alkali metal hydroxide, and thereafter returning at least part of the regenerated solution for reuse in the process.

7. The process of claim 5 wherein the alkali metal hydroxide is sodium hydroxide.

8. The process of claim 5 wherein the mixture of cadmium source material and aqueous alkali metal hydroxide is heated to 200 to 225° C. for about 2 to 3 hours under a pressure of from 250 to 400 p.s.i.g.

9. The process of claim 5 including the additional steps of:
  (a) subjecting the cadmium source material prior to its being treated in the autoclave to a preliminary leaching treatment with hot aqueous alkali metal hydroxide solution,
  (b) separating the residual solid phase from the leach liquor whereby a substantial reduction in the bulk of the cadmium source material is effected while retaining substantially all of the cadmium, silver, and gold values present in said cadmium source material in said solid phase, and
  (c) then treating the separated solid phase in the autoclave with the oxidizing atmosphere in said autoclave being provided by the use of oxygen.

10. In a process for the recovery of cadmium and other metal values from a cadmium source material consisting of metallurgical dusts and fumes containing cadmium at least partly as sulfide, above 0.05% by weight of arsenic and values of at least one other metal selected from the group consisting of lead, zinc, silver and gold, the steps comprising:
  (a) heating said cadmium source material in admixture with an aqueous solution of sodium hydroxide to between 175 and 300° C. in an autoclave for from 1.5 to 6 hours under an oxidizing atmosphere maintained at a pressure of from 200 to 500 p.s.i.g., the weight ratio of sodium hydroxide to cadmium source material being between 1 and 5 to 1 respectively and the weight ratio of water to sodium hydroxide being between 1 and 5 to 1 respectively, said heating resulting in solubilizing a major portion of the arsenic while oxidizing the cadmium sulfide to cadmium oxide,
  (b) separating the residual solids containing substantially all of the cadmium, silver and gold values and at least part of the lead and zinc values present in said cadmium source material from the caustic solution containing the solubilized arsenic, zinc and lead values,
  (c) treating the separated residual solids for the recovery of cadmium and other metal values therefrom, and
  (d) processing the caustic solution for the separation of lead and arsenic and regeneration of sodium hydroxide in said solution.

11. The process of claim 10 wherein the treatment of the caustic solution for lead and arsenic removal and regeneration of sodium hydroxide comprises the steps of:
  (a) adding aluminum powder to said caustic solution to cement lead therefrom,
  (b) removing the precipitated lead from said solution,
  (c) adding to the resulting filtrate a reactant suitable for precipitating calcium arsenate and calcium aluminate from said solution with sodium hydroxide being simultaneously formed, said reactant being selected from the group consisting of (1) calcium hydroxide and chlorine, and (2) chlorinated lime, and
  (d) removing the precipitated salts from the resulting regenerated sodium hydroxide solution.

12. The process of claim 10 wherein the regenerated sodium hydroxide solution is returned for repeated use in the autoclaving step until substantially saturated with respect to soluble zincates and sodium sulfate.

13. In a process for the recovery of cadmium from a cadmium source material consisting of metallurgical dusts and fumes containing cadmium at least partly as sulfide and in excess of 0.1% by weight of arsenic, the steps comprising:
  (a) leaching said cadmium source material in hot aqueous sodium hydroxide solution,
  (b) separating the undissolved residue from the leaching solution thereby providing a cadmium containing residue and a leach liquor filtrate,
  (c) heating the cadmium containing residue in admixture with an excess of aqueous sodium hydroxide in an autoclave and under an oxidizing atmosphere to at least 175° C. for a period of time sufficient to convert substantially all of the arsenic content of said residue to soluble form while oxidizing the sulfidic cadmium to cadmium oxide, said oxidizing atmosphere being provided by passing oxygen into the autoclave,
  (d) removing the residual solids still containing substantially all of the cadmium initially present in the cadmium source material and now containing less than 0.05% by weight of arsenic from the autoclaved reaction mixture thereby providing a filtrate,
  (e) treating the separated residual solids from the autoclaving step for the recovery of cadmium therefrom, and (f) recycling at least part of the filtrate from step (d) for reuse in the process.

14. The process of claim 13 wherein the leach liquor filtrate from step (b) is separately processed for removal of lead and arsenic and regeneration of sodium hydroxide and thereafter returned to supplement the sodium hydroxide solution used in the preliminary leaching step.

15. The process of claim 13 wherein the leach liquor filtrate from step (b) is processed for removal of lead and arsenic and regeneration of sodium hydroxide after combining therewith at least part of the filtrate from step (d) and thereafter returning the regenerated sodium hydroxide solution for reuse in the process.

References Cited by the Examiner

UNITED STATES PATENTS 2,350,918  6/1944  Norlander _____ 75—98
2,676,096  4/1954  Emert _____ 75—121

OTHER REFERENCES

Budgen: Cadmium, Charles Griffin & Co., London, 1924, Chapters I and II, pages 8–69.

DAVID L. RECK, *Primary Examiner.*

BENJAMIN HENKIN, *Examiner.*

H. W. CUMMINGS, N. F. MARKVA,
*Assistant Examiners.*